United States Patent
St. Clair et al.

(10) Patent No.: US 7,942,248 B2
(45) Date of Patent: May 17, 2011

(54) ADJUSTABLE DAMPING CONTROL WITH END STOP

(75) Inventors: Kenneth A. St. Clair, Cary, NC (US); Kenneth R. Boone, Cary, NC (US); Douglas E. Ivers, Cary, NC (US)

(73) Assignee: LORD Corporation, Cary, NC (US)

( * ) Notice: Subject to any disclaimer, the term of this patent is extended or adjusted under 35 U.S.C. 154(b) by 554 days.

(21) Appl. No.: 10/334,200

(22) Filed: Dec. 31, 2002

(65) Prior Publication Data
US 2004/0124049 A1 Jul. 1, 2004

(51) Int. Cl.
F16F 9/53 (2006.01)
(52) U.S. Cl. .................................. 188/267.1; 188/267.2
(58) Field of Classification Search .............. 188/267.1, 188/267.2, 267, 280, 281, 282.1, 282.2, 282.3, 188/284; 701/37
See application file for complete search history.

(56) References Cited

U.S. PATENT DOCUMENTS

| | | | |
|---|---|---|---|
| 3,807,678 A | 4/1974 | Karnopp et al. | |
| 4,054,295 A * | 10/1977 | Elliott | 280/6.159 |
| 4,821,849 A | 4/1989 | Miller | |
| 4,881,172 A | 11/1989 | Miller | |
| 4,887,699 A | 12/1989 | Ivers et al. | |
| 4,936,425 A | 6/1990 | Boone et al. | |
| 4,949,573 A | 8/1990 | Wolfe et al. | |
| 5,104,144 A * | 4/1992 | Bethell | 188/284 |
| 5,263,558 A * | 11/1993 | Yamaoka | 188/267 |
| 5,276,622 A * | 1/1994 | Miller et al. | 701/37 |
| 5,276,623 A * | 1/1994 | Wolfe | 701/37 |
| 5,293,971 A * | 3/1994 | Kanari et al. | 188/282.1 |
| 5,652,704 A | 7/1997 | Catanzarite | |
| 5,712,783 A | 1/1998 | Catanzarite | |
| 5,732,370 A | 3/1998 | Boyle et al. | |
| 5,964,455 A | 10/1999 | Catanzarite et al. | |
| 6,049,746 A * | 4/2000 | Southward et al. | 701/37 |
| 6,424,894 B2 * | 7/2002 | St. Clair | 701/37 |
| 6,695,102 B1 * | 2/2004 | Marjoram et al. | 188/267.2 |
| 2001/0037169 A1 * | 11/2001 | Clair | 701/37 |
| 2002/0011699 A1 | 1/2002 | St.Clair | |

* cited by examiner

*Primary Examiner* — Thomas J Williams
(74) *Attorney, Agent, or Firm* — Edward F. Murphy, III

(57) ABSTRACT

A damper device comprising a first mode having a first level of damping, a second mode having a second level of damping corresponding to a predetermined function, a sensor system having a first output corresponding to a normal position and a second output corresponding to an end stop approaching position, and a control system operable for receiving the first output and the second output and executing the first mode and the second mode. The damper device is operable in the first mode when the control system receives the first output and is operable in the second mode when the control system receives the second output. A controllable suspension system comprising a damper device, a magnetic probe, a sensor system comprising at least one position sensor operable for sensing the position of the magnetic probe, and a control system electronically connected to the sensor system and the damper device, wherein the control system is operable for receiving an output from the sensor system and executing a predetermined function to control the damper device. Electric signals are supplied to the damper device from the control system during system operation to provide damping sufficient to prevent end stop collisions.

17 Claims, 11 Drawing Sheets

ADJUSTABLE DAMPING CONTROL WITH END STOP

CROSS-REFERENCE TO RELATED APPLICATIONS

United States Utility Patent Application by Marjoram et al., entitled "MAGNETORHEOLOGICAL TWIN-TUBE DAMPING DEVICE" filed the same day as the present Application is related and hereby incorporated by reference.

BACKGROUND OF THE INVENTION

1. Field of the Invention

The present invention relates generally to the field of suspension devices. More particularly, the present invention relates to control systems and methods that utilize a specially tuned damper, controller, and sensor to trigger an end stop function.

2. Description of the Related Art

In vehicle use, vibrations, shock, and motion resulting from uneven road surfaces are transferred to a vehicle operator through the operator's seat. Over time, these conditions may lead to dangerous vehicle operation, fatigue, lower-back pain, osteoarthritis and leg discomfort. Typically, seats used in commercial and public transportation vehicles, such as trucks and buses, include suspension systems that aid in reducing the discomfort felt by the vehicle operator. These suspension systems typically include a mechanical device, such as a damper, attached between two structural members, such as a seat frame and a vehicle chassis. Dampers are well known which use a fluid as the working medium to create damping forces/torques and to control vibration, motion and shock. In particular, controllable dampers are well known that include electrorheological fluid (ER), electrophoretic fluid (EP), magnetorheological fluid (MR), hydraulic fluid, etc. In simple suspension systems passive dampers may be used. In more complicated suspension systems, adjustable dampers and controllers may be used to control the movement of the damper components and prevent end stop collisions.

Under certain conditions, some or all of these conventional suspension systems provide little transition into the end stops, and the end stops themselves tend to be very abrupt and uncomfortable for the operator. The end stops are defined as the maximum mechanical limits of system travel. Generally, there are shock reducing snubbers, often elastomeric, that are designed into the system. However, if the system velocity is high enough when an end stop collision occurs, a very rapid impact may result. This bottoming or topping imparts unwanted stresses to the mechanical components in the system (e.g. linkages, swing arms, bushings, joints, etc.), is detrimental to the system's overall life, can be an annoyance to the seat occupant, and may effect the physical health of the seat occupant. More significantly, when a vehicle operator experiences an end stop collision, the motion in the seat may lead to a loss of control of the vehicle.

Various methods have been employed to control vibration in seat suspension systems. Generally, in such prior art control methods, operating conditions are obtained by at least one sensor which supplies system operating information to a processor that determines the appropriate primary control signal to be sent to an electro-mechanical device, such as a magnetorheological (MR) fluid damper, for controlling vibration. A number of the various prior art methods for controlling vibration are described in the following issued United States patents: "Skyhook Control" as described in U.S. Pat. No. 3,807,678 to Kamopp et al.; "Relative Control" as described in U.S. Pat. No. 4,821,849 to Miller; "Observer Control" as described in U.S. Pat. No. 4,881,172 to Miller; "Continuously Variable Control" as described in U.S. Pat. No. 4,887,699 to Ivers et al.; "Delayed Switching Control" as described in U.S. Pat. No. 4,936,425 to Boone et al.; "Displacement Control" as described in U.S. Pat. No. 5,276,623 to Wolfe; "Rate Control" as described in U.S. Pat. No. 5,652,704 to Catanzarite; "Modified Rate Control" as described in U.S. Pat. No. 5,712,783 to "Method for AutoCalibration of a Controllable Damper Suspension System as described in U.S. Pat. No. 5,964,455 to Catanzarite; and "End Stop Control Method" as described in U.S. Pat. No. 6,049,746 to Southward et al.

One conventionally controlled ride management system uses a passive damper to reduce seat motion. Soft passive dampers provide smooth mid-ride performance but leave the seat occupant vulnerable to the uncomfortable and possibly harmful effects of topping and bottoming during unexpected large vibration inputs. Firm passive dampers, on the other hand, may minimize topping and bottoming, but mid-ride performance is compromised. Another version of a passive damper is used where the driver may manually adjust between a soft ride and a firm ride. This still has the same disadvantages discussed above.

A simple controllable damper technique for suspension control involves using a controlled bleed arrangement to shape the force velocity curve in the low-speed region, and adjusts the control signal to the damper to control the desired level of control. One damper is used for each corner of the car, for example. However, there is no form of end stop control.

A more advanced seat suspension control system used to maintain comfortable driving conditions by reducing vibration, shock, and motion is the Motion Master® Ride Management System offered for sale by the Lord Corporation (Lord Corporation, Cary, N.C.). The Motion Master® system is made up of four components. The first is a position sensor operable for monitoring movement of the seat caused by changing road and operating conditions. The second is a controller that continuously receives signals from the position sensor, determines optimal damping forces and is capable of adjusting at a rate of 180 times per second. The third is a shock absorber (damper) operable for responding to the controller within milliseconds. The last component is a ride mode switch that enables the vehicle operator to choose among different ride options, such as soft, medium and firm settings based on the operator's preference. The position sensor and shock absorber are separate units that are mounted between two structural bodies. The shock absorber contains a magnetically responsive fluid that when subjected to a magnetic field is capable of changing from a near-solid to a liquid and back in a matter of milliseconds. The stronger the magnetic field, the more viscous the fluid and the greater the damping force.

What is needed is a simple and inherently low-cost damping control method for any type of suspension system, such as a suspended seat. What is needed is a damper and control method that can be used where the cost of a full featured damper controller cannot be tolerated, and where the performance benefits of controllable damping are of value. Other non-seating applications, such as an automobile suspension for example, may also benefit from such a low-cost high-function damping system.

BRIEF SUMMARY OF THE INVENTION

In one embodiment, the present invention includes a damping device including a first mode having a first level of damping, a second mode having a second level of damping corresponding to a predetermined function, a sensor system having a first output corresponding to a normal position and a second output corresponding to end stop approaching, and a control system operable for receiving the first output and the second output and executing the first mode and the second mode. The damping device is operable in the first mode when the control system receives the first output and is operable in the second mode when the control system receives the second output. The first level of damping comprises a first steady state function corresponding to a soft, medium or firm ride mode setting as selected by the driver/operator. The predetermined function comprises a second steady state function, a ramp-up function, a ramp-down function, a magnitude function, a duration function and a duration truncating function. The predetermined function may be a timed response having a predetermined shut-off time, a truncated response that cuts short the timed response and a response based on a measure of relative velocity.

In another embodiment, the first state may be executed when the sensor system senses that the damping device is operating between an upper end stop control limit and a lower end stop control limit. The second state may be executed when the sensor system senses that the damping device has passed either the upper end stop control limit or the lower end stop control limit. The truncated response may be executed if the damping device re-crosses the upper or lower end stop control limits into a travel distance in which the sensor system transmits the first output.

In a further embodiment, the present invention includes a suspension system having an upper end stop, a lower end stop, an upper end stop control limit, a lower end stop control limit, and a damping device for adjusting the suspension velocity. The suspension system is controlled in order to limit end stop collisions. In a still further embodiment, the present invention includes sensing the position of the suspension system relative to the upper and lower end stop control limits using at least one sensor, calculating a duration and magnitude level of damping corresponding to a predetermined function if it is determined that the suspension system has traveled beyond the upper or lower end stop control limits toward the upper and lower end stops, respectively, transmitting a control signal to the damper device to increase the damping force to a required level, applying the damping force. The control method may be operable for executing a predetermined steady state level of damping if it is determined that the suspension system has not traveled beyond the upper or lower end stop control limits toward the upper or lower end stops, respectively. The predetermined function includes a steady state function, a ramp-up function, a ramp-down function, a magnitude function, a duration function and a duration truncating function. The duration and magnitude of damping calculation may be derived from a measure of suspension relative velocity. The predetermined function is applied using control methods including a timed response having a predetermined shut-off time, a truncated response that cuts short the timed response and a response based on a measure of relative velocity. The truncated response may be executed if the damping device re-crosses the upper or lower end stop control limits into a travel distance between the upper and lower end stop control limits.

In a still further embodiment, the present invention includes a controllable suspension system including a damping device having a moveable end and a stationary end for attachment to a first structural member and a second structural member, respectively, a magnetic probe fixably attached to the moveable end, a sensor system comprising at least one position sensor operable for sensing the position of the magnetic probe, and a control system electronically connected to the sensor system and the damper device. The control system is operable for receiving an output from the sensor system and executing a predetermined function to control the damping device. The control system is further operable for supplying electric signals to the damping device to provide damping sufficient to prevent the system from reaching upper or lower end stop limits.

In a still further embodiment, the magnetic probe includes a single magnet set-up with a ferrous rotary or linear magnetic field interrupter or a dual magnet linear or rotary probe. The damper device contains a field responsive fluid such as magnetorheological (MR) fluid or electrorheological (ER) fluid.

BRIEF DESCRIPTION OF THE DRAWINGS

A variety of specific embodiments of this invention will now be illustrated with reference to the Figures. In these Figures, like elements have been given like numerals.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Throughout the drawings, like elements are given like numerals. The damping control methods and systems described below apply to seating applications, however, in principle also apply to any non-seating application requiring a high-function damping system.

Figure 1:
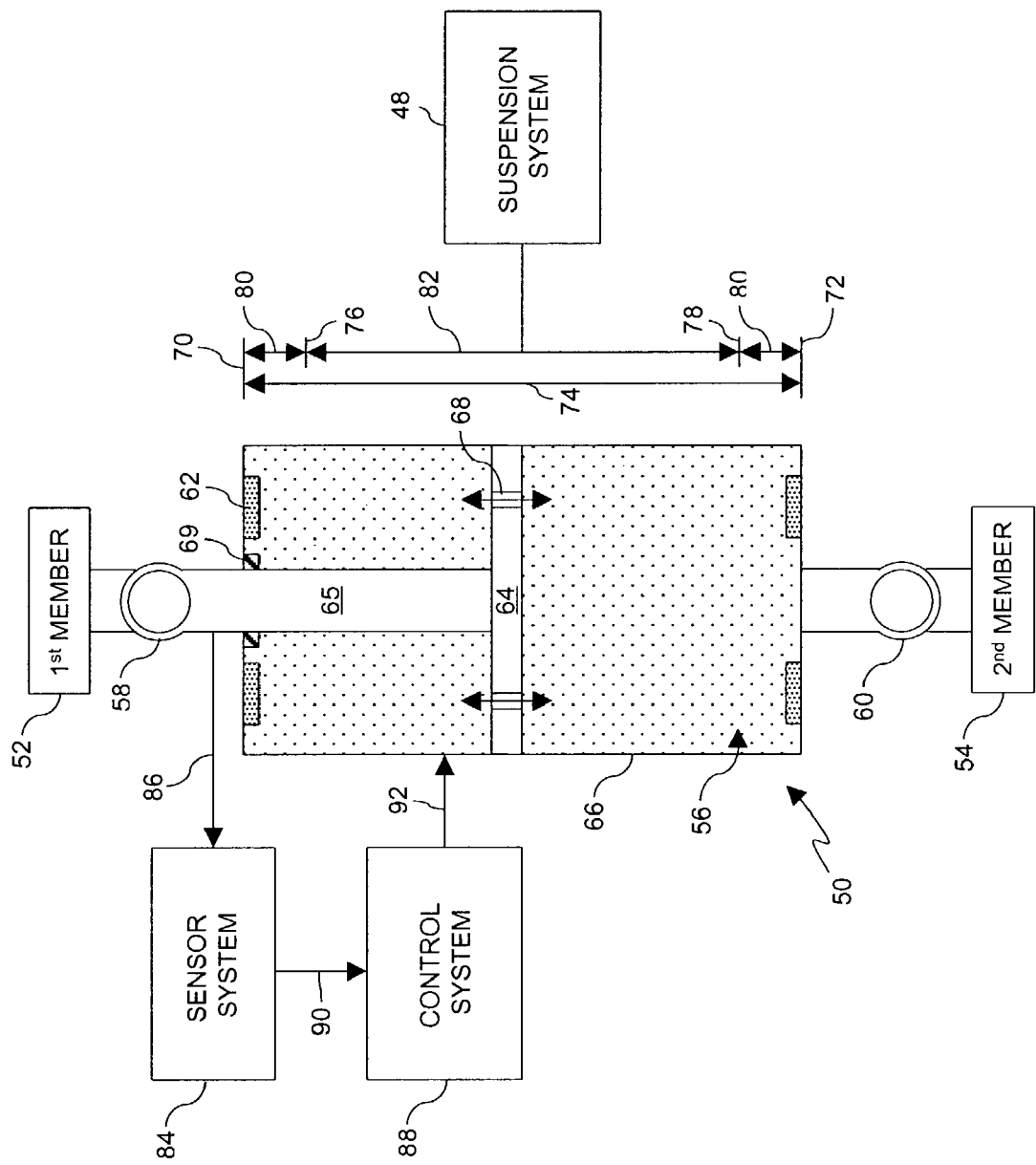
FIG. 1 is a schematic representation of suspension system travel limits including a mechanically linked damping device in accordance with an exemplary embodiment of the present invention.

Referring now to FIG. 1, the suspension system 48 being controlled generally includes an electro-mechanical damping device 50 that is attached between a first structural member 52 and a second structural member 54. The electro-mechanical damping device 50 may include, for example, a magnetorheological (MR) damping or an electrorheological (ER) damping containing a field responsive material or fluid 56. The fluid is a composition that undergoes a change in apparent viscosity in the presence of a magnetic/electric field. In the presence of an applied magnetic/electric field, microparticles in the fluid become polarized and organize into agglomerations or chains, which increases the apparent viscosity or flow resistance of the fluid. When the applied magnetic/electric field is removed, the microparticles return to an unorganized or random state and the apparent viscosity of the MR fluid is lowered. The electro-mechanical damping device 50 is attached to the first and second structural members 52, 54 at its ends 58, 60 by way of bolts or other fastening means. The first and second structural members 52, 54 may be any two relatively movable structures, such as a suspension component (e.g. frame, bracketry, linkages, etc.), a frame of a motor vehicle, a seat, etc. Optionally, a plurality of elastomeric stops 62 ("snubbers"), illustrated here as inside the damping device 50, may function as a last resort in preventing an end stop collision.

The damping device 50 generally comprises a piston 64 and rod 65 mounted within a chamber formed by damper body 66 and adapted for sliding motion in sliding contact with the interior of the damper body 66. The piston 64 generally includes a soft piston band that provides a seal between the piston 64 and the tubular damper body 66. The damping device 50 further includes a sealed interior space that is substantially filled with the fluid and divided into two chambers by the piston 64. The piston 64 may include a flow passageway 68 that permits the fluid to flow between the two chambers. A seal and bearing assembly 69 prevents the escape of the fluid 56 and helps align the rod 65 and piston 64 within the housing. The damping device 50 may utilize an intentional amount of cross-piston 64 or cross-valve bleed to reduce the harshness of the damping during direction reversals. This allows the basic mid-ride damping to be fixed. The damper device 50 then operates somewhat like a conventional adjustable passive damper with no active control required. Control is achieved by adjusting the steady state control signal, which in turn adjusts the magnitude of the applied magnetic field, which adjusts apparent viscosity.

The suspension system 48 into which the damping device 50 is installed includes a first end of travel limit, or end stop 70, and a second end of travel limit, or end stop 72. The piston 64 travels a predetermined distance as the suspension moves between its end stops 70, 72. A large bump may cause the piston 64 to encounter the end stops 70, 72. The first and second end stops 70, 72 define the travel distance 74 of the suspension and therefore the piston 64 and correspond to the maximum and minimum separation distances that may exist between, for example, a suspended seat and a vehicle frame. The maximum travel distance of the piston 64 is defined as the total distance the piston 64 can travel from the first suspension system end stop 70 to the second end stop 72. A first (upper) control limit 76 and a second (lower) control limit 78 define the positions along the travel distance 74 at which a simple sensor is set to trip, changing the damping level by applying a predetermined function that generally increases the steady state current to the damping device 50. The first and second control limits 76, 78 may be set at any predetermined position, depending upon driver preference, the environment in which the suspension system is being used, or seat manufacturer's preference, and the profile of the predetermined function. The appropriate positioning of the end stop control limits 76, 78 may also be based on the type of damping device 50 used. For example, a damping device 50 with a responsive input command to output force curve may require less distance to appropriately prevent the suspension from colliding with one of the end stops 70, 72, as opposed to a damping device 50 with a less responsive command response time. For example, in one environment it may be desirable to have a soft ride in which the seat is allowed a greater travel distance, such as a truck operating on an uneven surface. In another example, it may be desirable to have a seat with a very limited travel distance, such as a firm ride for a racecar operating on an even racetrack surface. In one example, the first and second control limits 76, 78 may be set at a position 80 such as about 20% inward from the travel limits, providing a first mode travel distance 82 of about 60% of the total travel distance 74. In another example, the first and second control limits 76, 78 may be set at a position about 30% inward from the travel limits, providing a seat travel distance of about 40% of the total travel distance 74.

Still referring to FIG. 1, the suspension system 48 includes a sensor system 84. The sensor system 84 includes one or more sensors, such as proximity sensors, displacement sensors, hall effect switches, micro switches, optical switches, velocity sensor, a rotating cam with a micro switch, any other non-contact switches or sensors operable for determining the position of the piston 64, or a component associated with the piston 64, relative to the end stops 70, 72. The sensor system 84 is further operable for signaling a control system 88 when the suspension is nearing one of the end stops 70, 72. In one embodiment, one sensor may be used to detect the position of the piston 64 relative to the first and second control limits 76, 78. In another embodiment, two sensors may be used, one at each end of the travel distance 74 to detect the control limits 76, 78. In still another embodiment, one sensor may be used to determine the position of the piston 64 relative to the end stops 70, 72, while a second sensor is used to obtain estimates of velocity, as will be described in more detail below. When an end stop is approached, an input signal 86 is detected by the sensor system 84. The sensor system sends an input signal 90 from an output of the sensor system 84 to an input of a control system 88.

The control system 88 may, using a variety of techniques, set the control signal to a predetermined level, causing the damping device 50 to produce a predetermined force to help avoid contact at the suspension travel limits. The control system 88 receives a signal 92 from the sensor system when an end stop limit control limit 76, 78 is tripped, and determines and generates an end stop function. With the use of the sensor that is set to trip at some selected position, for example at about 20% distance inward from the travel limits, the damping level may be changed by applying an increased current to the damper. The control system 88 may include a simple analog or digital controller to provide adjustable damping, an appropriate microprocessor, and/or a memory to implement the overall control in accordance with the present invention. The end stop function controls a damping force applied to the system by the damping device 50 to prevent the suspension system from encountering the first and second end stops 70, 72. For example, in a seat suspension application, a damping force of too little magnitude will permit the seat to collide with the first and second end stops 70, 72 when the system encounters a change in road surface evenness. A damping force of too great a magnitude will create a harsh ride for the operator. In system 88, an optimal end stop transition is achieved by ramping up or down the damping force. The control system 88 and the sensor system 84 may be located in the same housing or they may be discrete components located in separate housings.

In various embodiments, the control system 88 is operable for adjusting the control signal supplied to the damper device 50 at an increased/decreased level, causing the damper device 50 to produce an adjustable force to avoid contact at the suspension end stop limits and reduce vibration and motion between the first and second members 52, 54. The control system 88 is further operable for turning the damping off or reducing the level of damping to avoid unwanted forces when the suspension system reverses its direction from the end stop and crosses back across a control limit. The control system 88 may execute one of several preprogrammed control functions depending upon the situation, such as applying one control function in the case of the suspension traveling just past the end stop control limits 76, 78, as compared to traveling well past the control limits 76, 78 almost approaching the suspension end stops 70, 72.

Figure 2C:
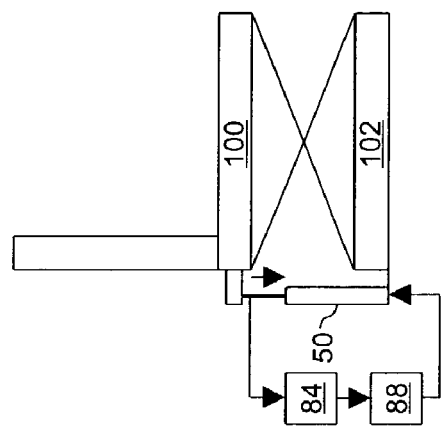
FIGS. 2a-c are schematic representations of a seat suspension system that utilizes an end stop control system to eliminate end stop collisions in accordance with an exemplary embodiment of the present invention.
Figure 2B:
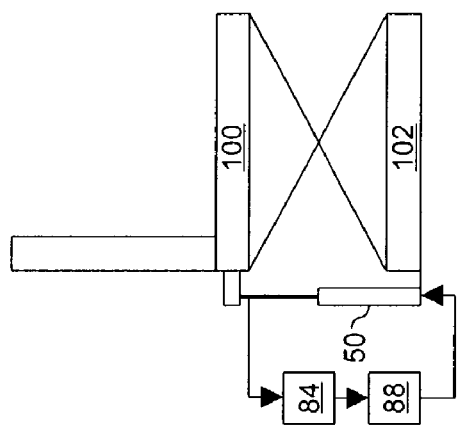
Figure 2A:
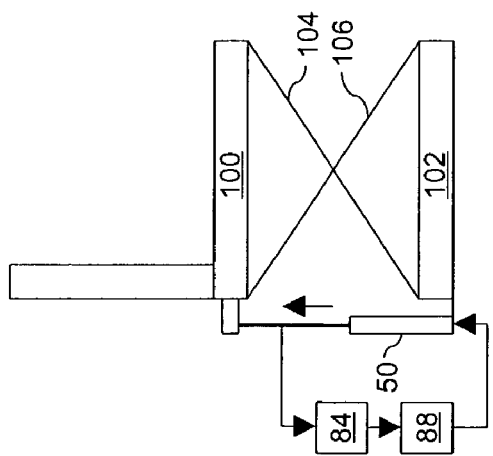

Referring now to FIGS. 2a, 2b and 2c, varying positions of a typical seat suspension system adapted for use in combination with the end stop control systems of the present invention are schematically illustrated. The sensor system 84 senses a positioning of the damping device 50, such as the piston 64 position, relative to the maximum and minimum end stop limits 70, 72. The exemplary suspension system supports a seat 100 connected to a seat base 102. The suspension system will approach end stop 70 when the seat 100 is in a predetermined extended position relative to the base 102 (FIG. 2a) or end stop 72 when in a predetermined contracted position relative to the base 102 (FIG. 2c). The leveled seat 100 position (FIG. 2b) is the position that the seat assumes when it is unaffected or substantially unaffected by vibratory disturbances. The leveled seat position may be selected and adjusted by the seat occupant based on comfort and personal preference. When either the first or second end stop control limit is tripped 76, 78, the control signal supplied to the damping device 50 is adjusted to rapidly increase the damping profile, also referred to as the damping level.

The seat 100 may include a mechanical multibar linkage having a first link 104 and a second link 106. The linkage in FIGS. 2a-c is shown in two-dimensions for illustrative purposes only, and it should be understood that the linkage may include additional members comprised of any suitable mechanisms for movably joining the seat 100 and the suspension system. The mechanical linkage may be of a conventional design well known to one skilled in the art and therefore further description of the linkage is not required. One or more position sensors of the sensor system 84 are connected to the damping device 50 and serve to sense the position of the piston 64 and in turn the seat 100. The sensor system 84, control system 88 and damping device 50 are electronically connected.

The control systems of the present invention automatically sense and respond to the approach of the end stops 70, 72 by controlling the control signal, for example current or voltage, supplied to the damping device 50. The damping device 50 is capable of operating in two modes, with each mode having its own corresponding damping characteristics. The first damping mode is a steady state mode having a first level of damping, optionally selected from among a plurality of damping levels. The first level of damping corresponds to normal operation within the end stop control limits 76, 78. Normal operation damping may be defined as the operating mode in which the piston 64 travels between the first and second end stop control limits 76, 78 and does not cross those limits. The magnitude of the control signal applied to the damping device 50 during the steady state mode may be adjusted to provide a soft, medium, firm, or any other suspension setting corresponding to a magnitude of damping where a soft magnitude is less than a medium magnitude which is less than a firm magnitude. The setting may be adjusted by the seat occupant or may be a predetermined setting based upon the type of application. The second damping mode includes a second generally increased level of damping corresponding to a predetermined function. The second mode may also be thought of as the end-stop mode. In the end-stop mode, the control system 88 applies a predetermined function based on the output of the sensor system 84. The function affects the damping level applied to the damper device 50 and includes damping magnitude, duration, ramping-up, ramping-down, or any other function in relation to the control signal.

The control system includes at least three control methods implemented by the control system: a timed end stop control method, a truncated control method that cuts short the timed end stop control method, and a control method that uses a measure of suspension relative velocity to turn off the end stop control pulse. In all three control methods, the control system 88 is operable for varying the current supplied to the damping device 50 thereby causing the damping device 50 to produce more force in order to avoid contact at the suspension travel limits or end stops.

Figure 3:
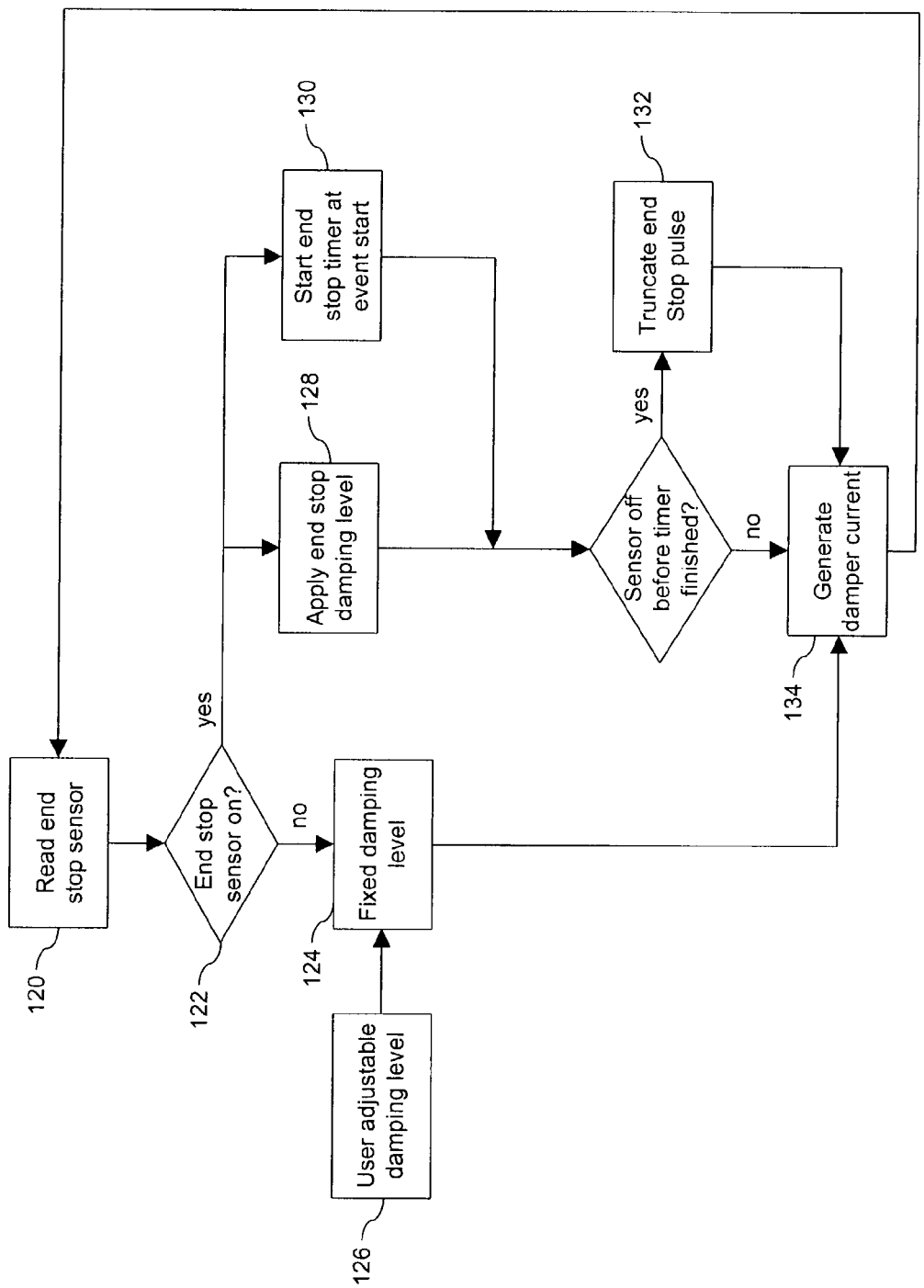
FIG. 3 is a flow chart illustrating a main control algorithm for operating mode determination in accordance with an exemplary embodiment of the present invention.

Referring now to FIG. 3, one control method for adjusting the control signal supplied to the damping device 50 includes using a timer to turn off the end stop control level after a predetermined time elapses. This embodiment operates very effectively in situations where the suspension travels well past the end stop control limits 76, 78 and near the end stops 70, 72.

Still referring to FIG. 3, the sensor system monitors (Block 120) the damping device 50 and its component positioning relative to the end stop control limits 76, 78. In real-time, the sensor system 84 sends an output to the control system 88 indicating if the end stop control limit has been reached (Block 122). If it is determined that the suspension travel has not reached the end stop control limit, then the suspension is in the first mode, and a fixed damping level is applied (Block 124). The fixed damping may be defined as the operating mode in which the suspension system travels between the first and second end stop control limits 76, 78 and does not cross those limits. The magnitude of the control signal applied to the damping device 50 during the steady state mode may be adjusted to provide a soft, medium, firm, or any other suspension setting. The setting may be adjusted by the seat occupant (Block 126) or may be a predetermined setting based upon the type of application. If it is determined that the suspension travel has reached an end stop control limit 76, 78, the predetermined time damping profile is applied (Block 128). The crossing of the end stop control limits 76, 78 triggers a timer within the control system 88 to begin a timed pulse (Block 130) having a duration t.

Figure 4:
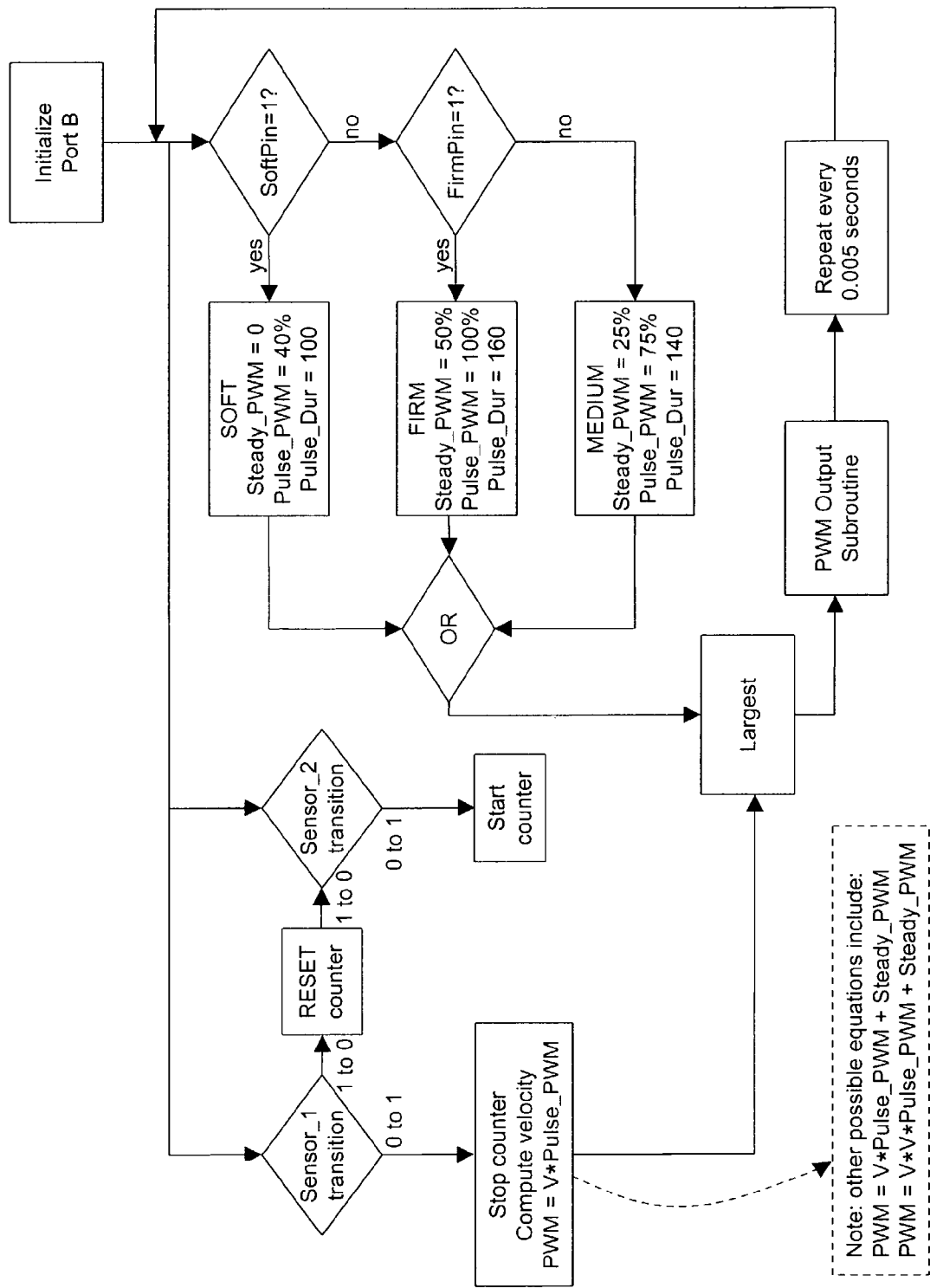
FIG. 4 is a schematic diagram illustrating one embodiment of an adjustable control system for controlling end stop collisions.

In the situation in which the suspension has traveled past either one of the end stop control limits 76, 78 toward the end stops 70,72, the control system timer will run for a predetermined period (t) until the timer has timed-out. The time period (t) should be adjusted to be long enough to slow down the seat 100, but short enough to allow the seat 100 to return to center. In the situation in which the suspension re-crosses the control limit back into the normal operating mode travel range, the control system 88 may cut short the end stop control pulse before the timer has run-out (Block 132). The magnitude of the damper control signal applied to the damping device 50 is then readjusted to apply the steady state mode (Block 134). By truncating the end stop pulse, ride comfort is greatly improved, especially in regards to smooth transitions. An exemplary embodiment for adjustable control is illustrated in FIG. 4.

In a further embodiment, the control system 88 receives an output signal from a second sensor of the sensor system 84 as an input to the control system 88 to trigger an end stop function. Therefore, as the seat 100 crosses one of the end stop control limits 76, 78 and approaches the corresponding one of end stops 70, 72, an additional damping force is calculated and applied to account for the potential collision with the first or second end stop 70, 72. A relative velocity damping force may be calculated based on the velocity of the seat 100 relative to the base 102. In one embodiment, the relative velocity damping force is not calculated until the seat crosses the predetermined end stop control limits 76, 78. As stated above, the end stop control limits 76, 78 are typically 025% of the total travel distance between the first and second end stops 70, 72. In this embodiment, the output sent by the sensor system 88 is an estimate of velocity. End-of-travel travel control is greatly improved when relative velocity is used to compute the damper force. The relative velocity may be used to determine the magnitude of the damping force. Further, the measure of suspension relative velocity may be used to turn off the end stop control pulse. For example, when zero velocity is approached, the control system 88 may end the end stop control pulse that was begun when the suspension initially crossed the control limit.

Figure 5:
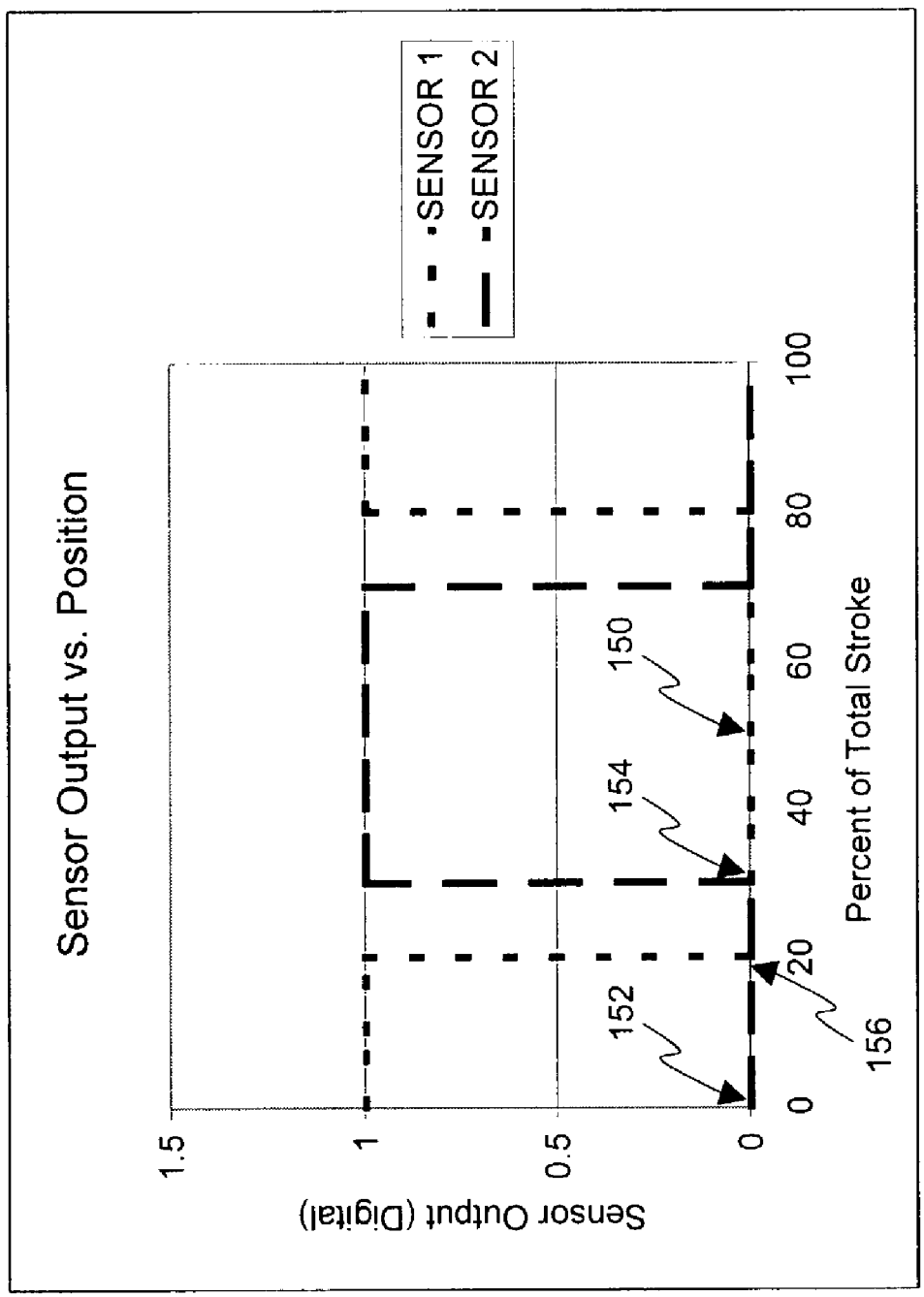
FIG. 5 is a graphical illustration of the switching of two position sensors during a stroke in accordance with an exemplary embodiment of the present invention.

Referring now to FIG. 5, an example arrangement is shown in which two position sensors, sensor 1 and sensor 2, switch during the stroke of piston 64. Together, sensors 1 and 2 determine the position of the piston 64 relative to the end stops 70, 72, and also provide for a calculated estimate of the relative velocity of the piston 64 as it passes by these sensors. The polarity of each sensor is irrelevant. The exact relative positioning of the sensors is left as an exercise for the designer/tuner based on the type of seat and related equipment that the suspension system is attached to. The sensor system trigger positions corresponding to the control limits selected for FIG. 5 are for illustration purposes only. If one trigger position for a single sensor is set at the 20% mark, then the positions for a dual sensor may be set at the 15% and 25% marks, or the 18% and 22% marks, for example. The exact sensor locations may be selected as part of the tuning process. In addition, the sensor trigger positions need not be symmetrical. If, for example, a particular application has a major problem with the 0% end-of-travel mark and little or no problem with the 100% end-of-travel mark, then the trigger positions may be selected as 15%, 20%, 25%, and 80%. This arrangement may be used for improved position and velocity information near the more critical end-of-travel.

In one example, the function may work as follows. With the piston 64 of the damping device 50 initially near the mid-stroke (50%) mark 150, assume that a large input occurs that drives the piston 64 toward the 0% stroke mark 152. When the piston 64 crosses the 30% stroke mark 154, sensor 2 may toggle and a timer (digital or analog) may be started in the control system 88. When the piston 64 crosses the 20% mark 156, the relative velocity may be computed as the distance traveled (x) divided by the time (t). An appropriate force magnitude may then be computed, such as a constant times the relative velocity squared. After the force magnitude is computed, the control system 88 applies a predetermined function that ramps the damper force up to the computed magnitude for a predetermined period of time, which itself may be a function of relative velocity. Numerous variations on the above example are envisioned. For example, the force may be ramped up to a predetermined nominal value at a relatively low rate between the 30% mark 154 and the 20% mark 156, and thereafter ramped to the final computed magnitude.

Figure 6:
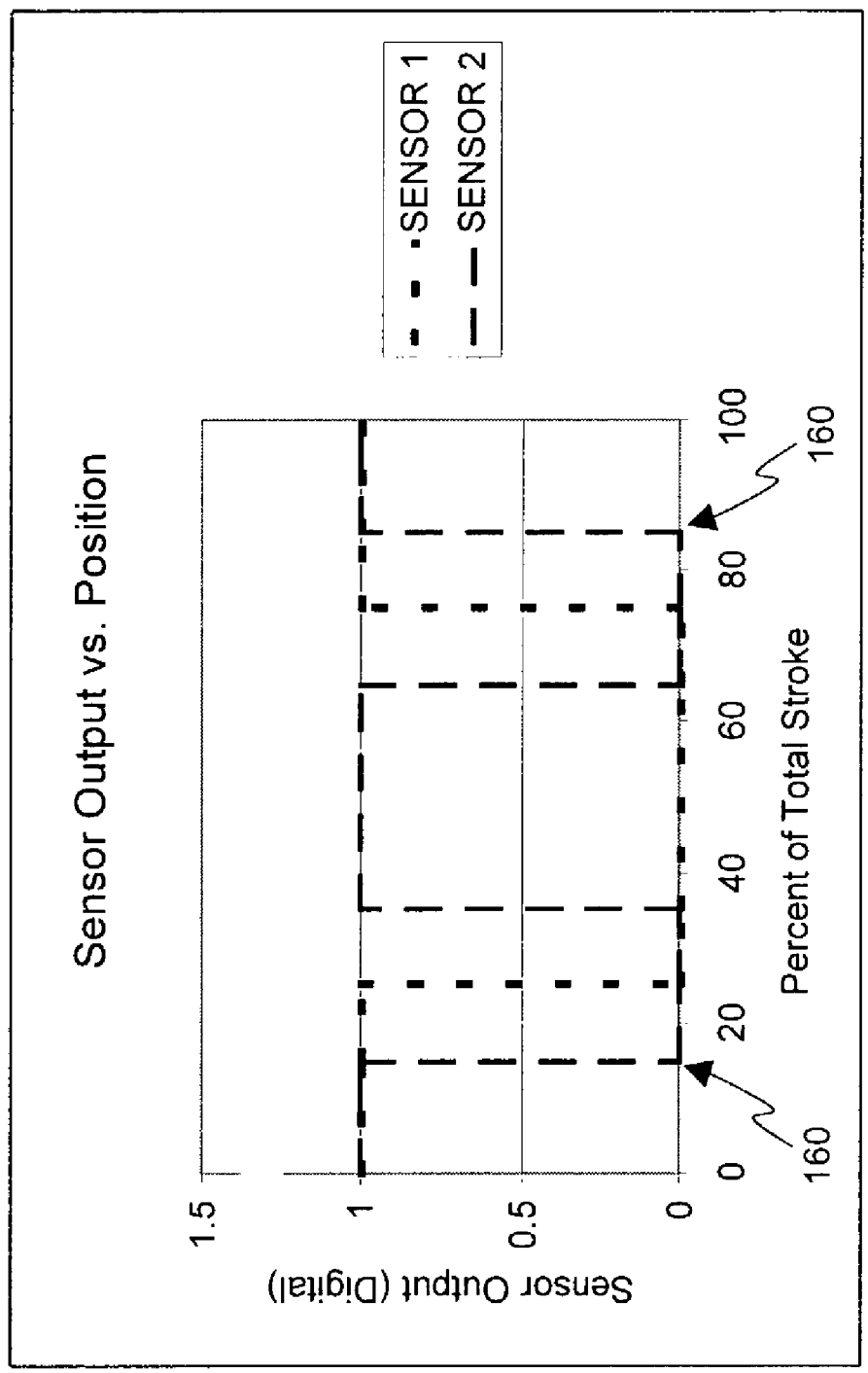
FIG. 6 is a graphical illustration of the switching of two position sensors during a stroke yielding all possible states of a 2-bit sensor sub-system in accordance with an exemplary embodiment of the present invention.

Depending on the type of position sensors implemented and the nature of the sensor target, it may be feasible and economical to capture additional information. Referring now to FIG. 6, added transitions 160 for sensor 2 are shown, yielding all possible states of a 2-bit sensor sub-system. Together, sensors 1 and 2 may determine the position of the piston 64 relative to the end stops 70, 72, and also provide for a calculated estimate of the relative velocity of the piston 64 as it passes by the sensors. If sensor 2 is a proximity probe, for example, then a relatively minor change in the target creates the added transition. The resulting position and velocity information may be used to further improve the end stop algorithm. It is envisioned that additional digital sensors may be added.

Figure 7:
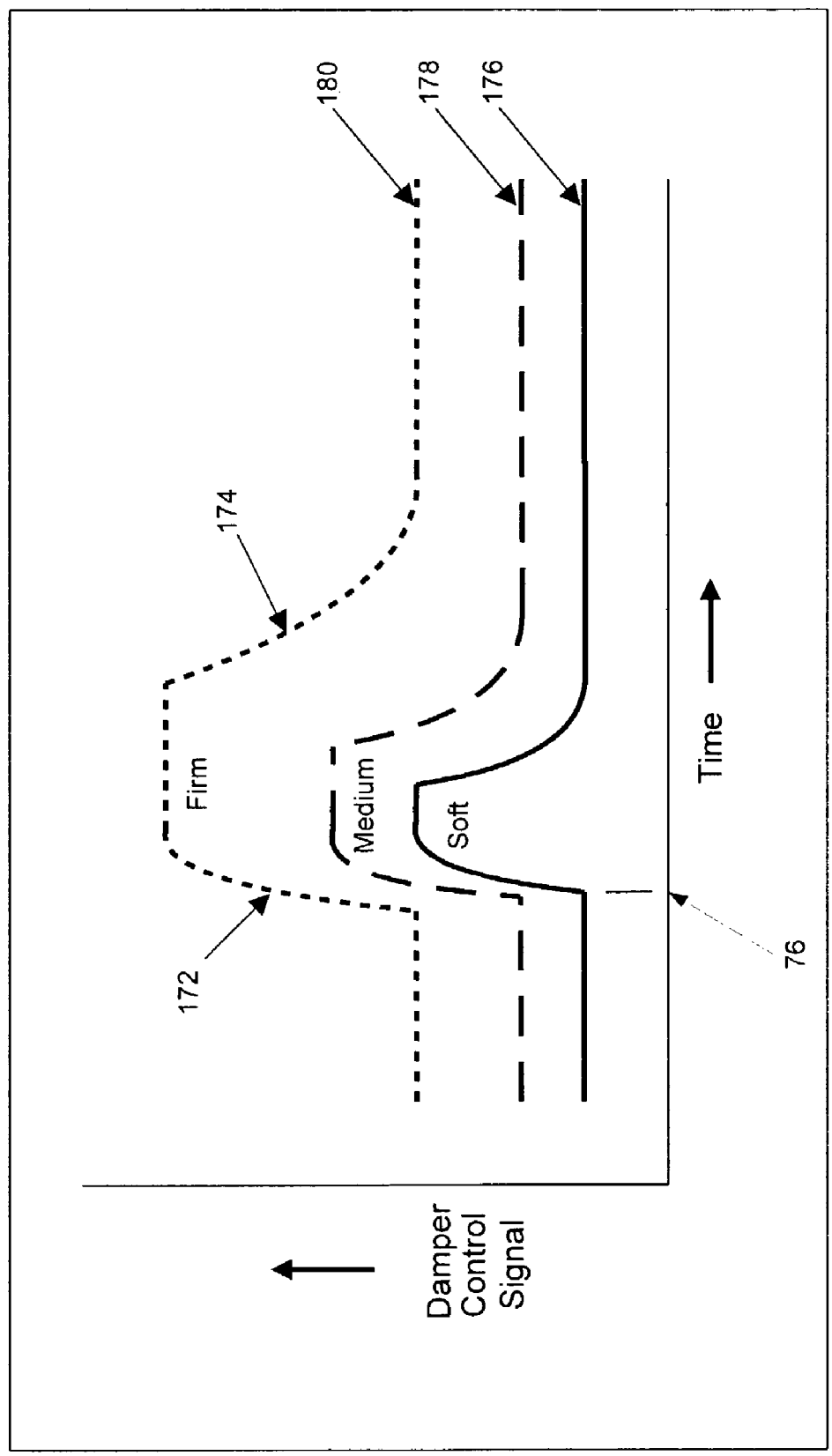
FIG. 7 is a graphical illustration of the effect of increasing current to avoid end stop collisions in accordance with an exemplary embodiment of the present invention.

Referring now to FIG. 7, the sensor system 84 continuously monitors the change in position of the suspension system over time. The sensor system determines if the suspension system is within the predetermined normal operating range. The end stop control systems of the present invention do not affect the control signal applied to the damping device 50 when the suspension is located between the end stop control limits 76, 78 except to adjust between control levels. When the suspension is outside of the end stop control limits 76, 78, the level of damping applied to the suspension is increased pursuant to the logic of the control function/algorithm. FIG. 7 shows that when an end stop trigger point 76, 78 is tripped, the control signal supplied to the damping device 50, in the form of an end stop control pulse, is rapidly increased (ramped-up) 172 in order to prevent an end stop collision. The magnitude of the damper control signal may be determined by the firmness setting chosen by the seat occupant or a predetermined setting based on a particular application. Damping settings may include, for example, steady control signal-soft 176, steady control signal-medium 178 and steady control signal-firm 180. The end stop control pulse may be ramped-up 172 until a desired amount of damping is achieved in order to avoid the end stop collision. When the end stop control pulse time period (t) expires, the control signal may then be ramped-down 174 to the steady state control signal of the steady state operating mode 176, 178, 180.

Figure 8:
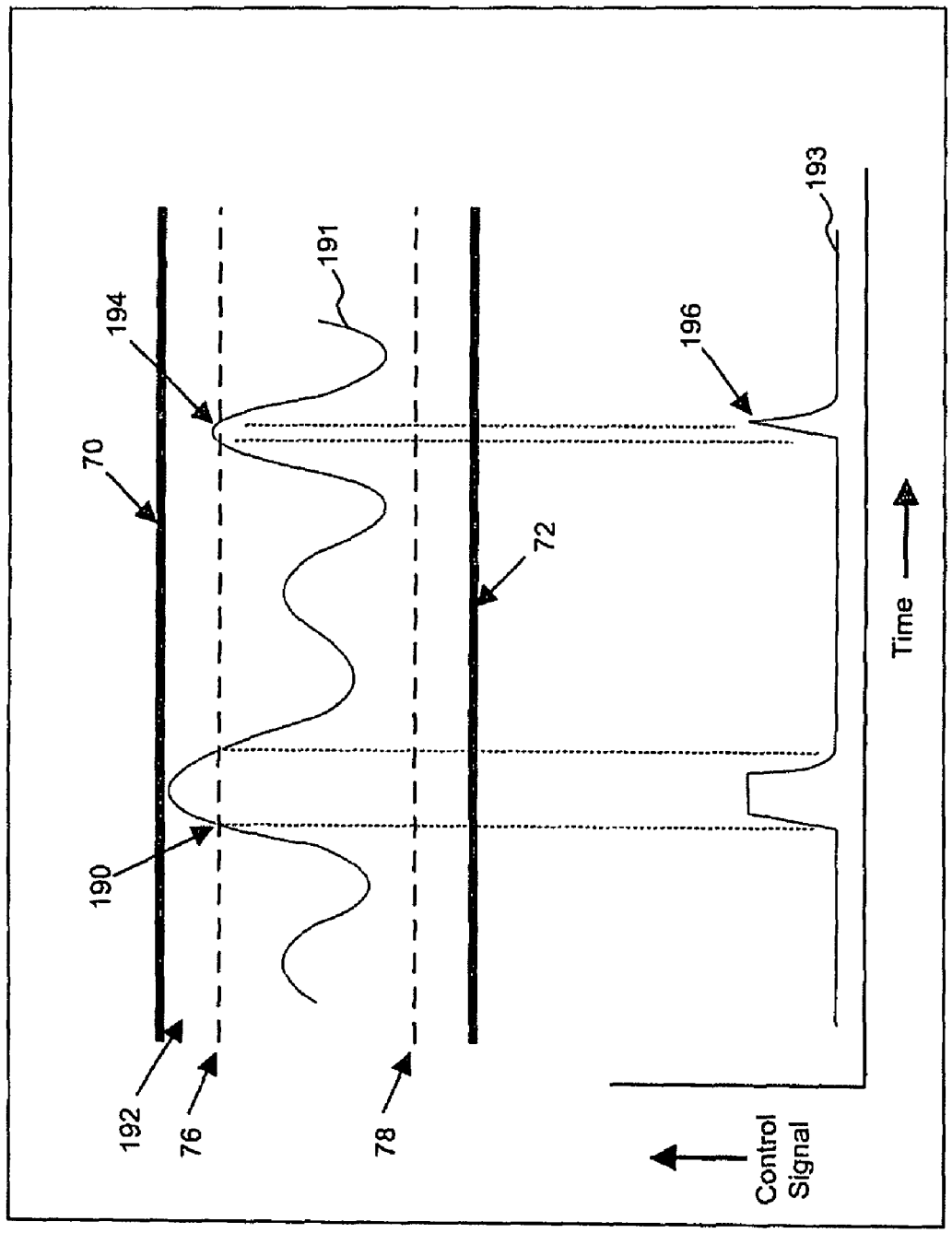
FIG. 8 is a graphical illustration of a comparison between a normal timed end stop control pulse and a truncated control pulse in accordance with an exemplary embodiment of the present invention.

Referring now to FIG. 8, a situation may occur in which the vehicle is subjected to a large shock, such as a large bump in the road. This may result in the suspension system crossing 190 the upper end stop control limit 76 well into an upper end stop zone 192. In this situation, the end stop control timer will be triggered and allowed to run to completion. The upper sinusoidal like trace 191 represents the motion of the suspension system and the lower sinusoidal trace 193 represents the control signal to the damping device 50. In another example, assume that the shock to the vehicle is just enough to cause the suspension to trip 194 the upper end stop control limit 76. While the suspension does cross into the upper end stop zone 192, the period of time that the suspension is in the upper end stop zone is less than the predetermined time of the end stop control pulse. In this situation it is undesirable to complete the full timed pulse, and the control signal pulse may be truncated 196. The control signal is returned to its steady state.

Figure 9:
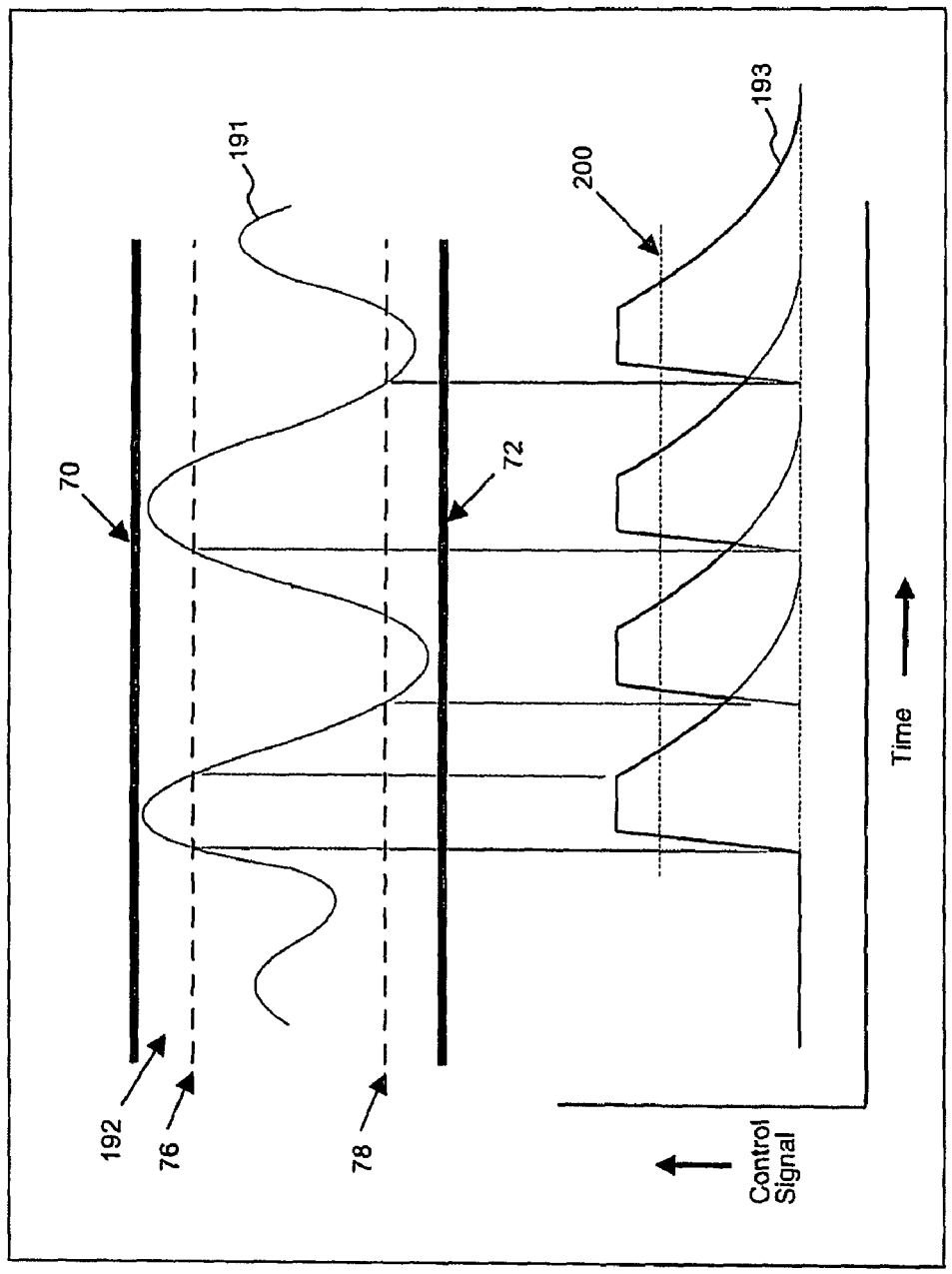
FIG. 9 is a graphical illustration of a pseudo-adaptive end stop control method in accordance with an exemplary embodiment of the present invention.

Referring now to FIG. 9, when the suspension system encounters a large series of events causing the suspension to repeat a pattern of tripping the upper end stop control limit 76 followed by tripping the lower end stop control limit 78, a pseudo-adaptive mode may result. The upper sinusoidal like trace 191 represents the motion of the suspension system and the lower sinusoidal trace 193 represents the control signal to the damping device 50. The pseudo-adaptive mode may have an effective average level of damping of a greater magnitude than the steady state function of the first mode. The end stop control pulse is initiated causing the damping device 50 to increase its damping force. As the suspension system re-crosses the upper end stop control limit 76 back into the steady state mode, the control signal returns to the predetermined steady state magnitude following a predetermined decay curve. In the pseudo-adaptive mode, the control signal never has a chance to return to the steady state mode magnitude because the lower end stop control point 78 is tripped, requiring the control system 88 to again increase the control signal applied to the damping device 50. The effective average control signal during a large series of events results in an effective increased steady control signal 200.

Figure 10:
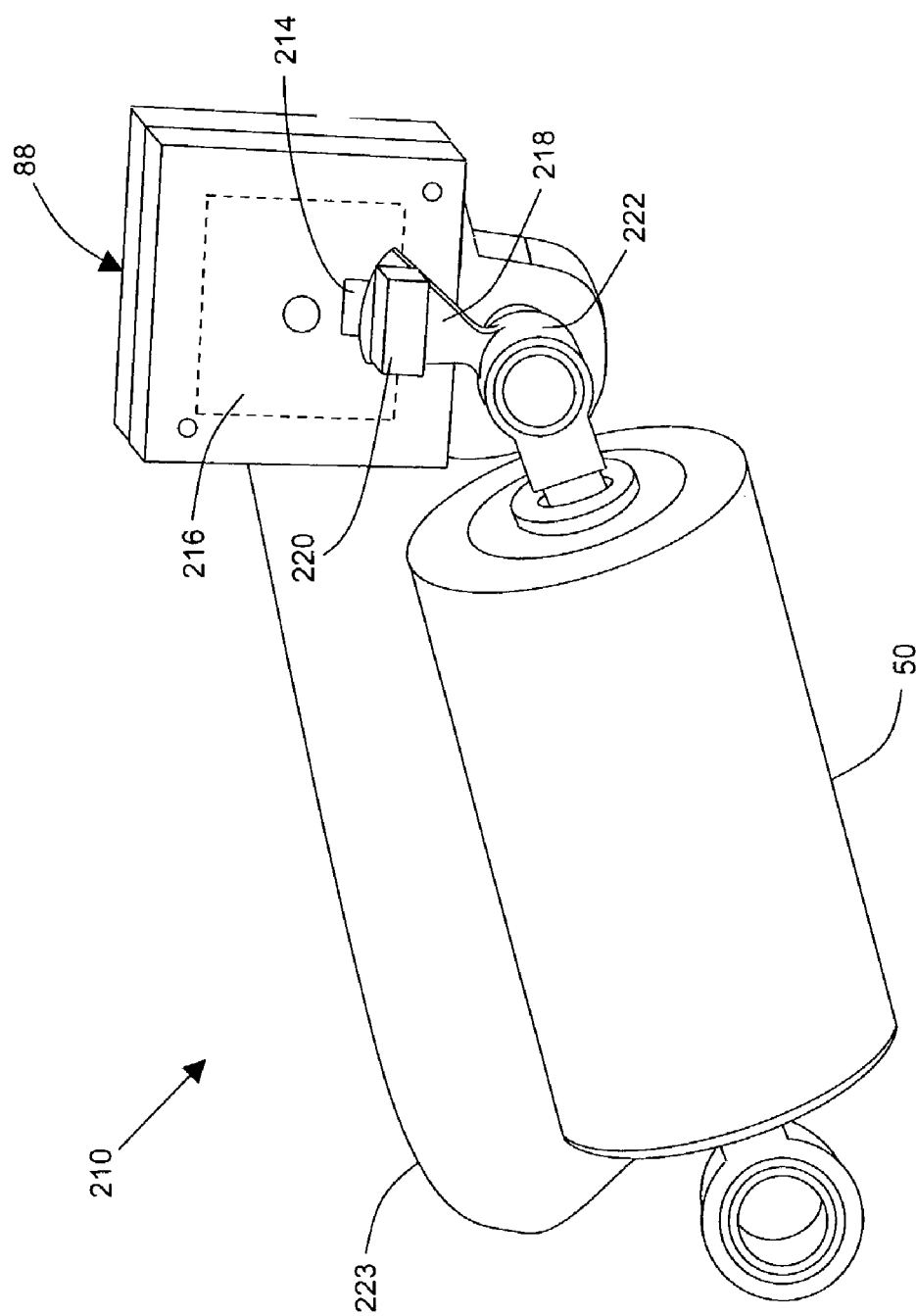
FIG. 10 is an illustration of a damping device, rotary position sensor and control system in accordance with an exemplary embodiment of the present invention.

FIG. 10 illustrates suspension control system 210 having a non-linear sensor system and an adjustable damping device 50 that may be controlled using the end stop control systems of the present invention. The damping device 50 contains a field responsive fluid, for example a magnetorheological fluid (MR) or an electrorheological fluid, whose yield shear strength may be changed upon the application of a magnetic/electric field. A position sensor 214 is connected to a controller system 88, such as a circuit board 216, and serves to sense the presence of a magnetic field, such as a single magnet 220 set up with a ferrous rotary-magnetic field interrupter 218. The field interrupter 218 is connected to a rod end 222 of the damping device 50. The control system 88 is electronically connected to the damper device via link 223. The position sensor 214 is electronically connected to the control system 88, which in turn is connected to the damping device 50. The damping device 50 serves to control the displacement of the seat 100 during operation. Electric signals are supplied to the damping device 50 via link 223 during system operation to provide damping sufficient to prevent the system from reaching the maximum and minimum end stop limits 70, 72 (FIG. 1). The sensor 214 is activated by the magnet 220 at the control limits 76,78 as the field interrupter 218 rotates.

Figure 11:
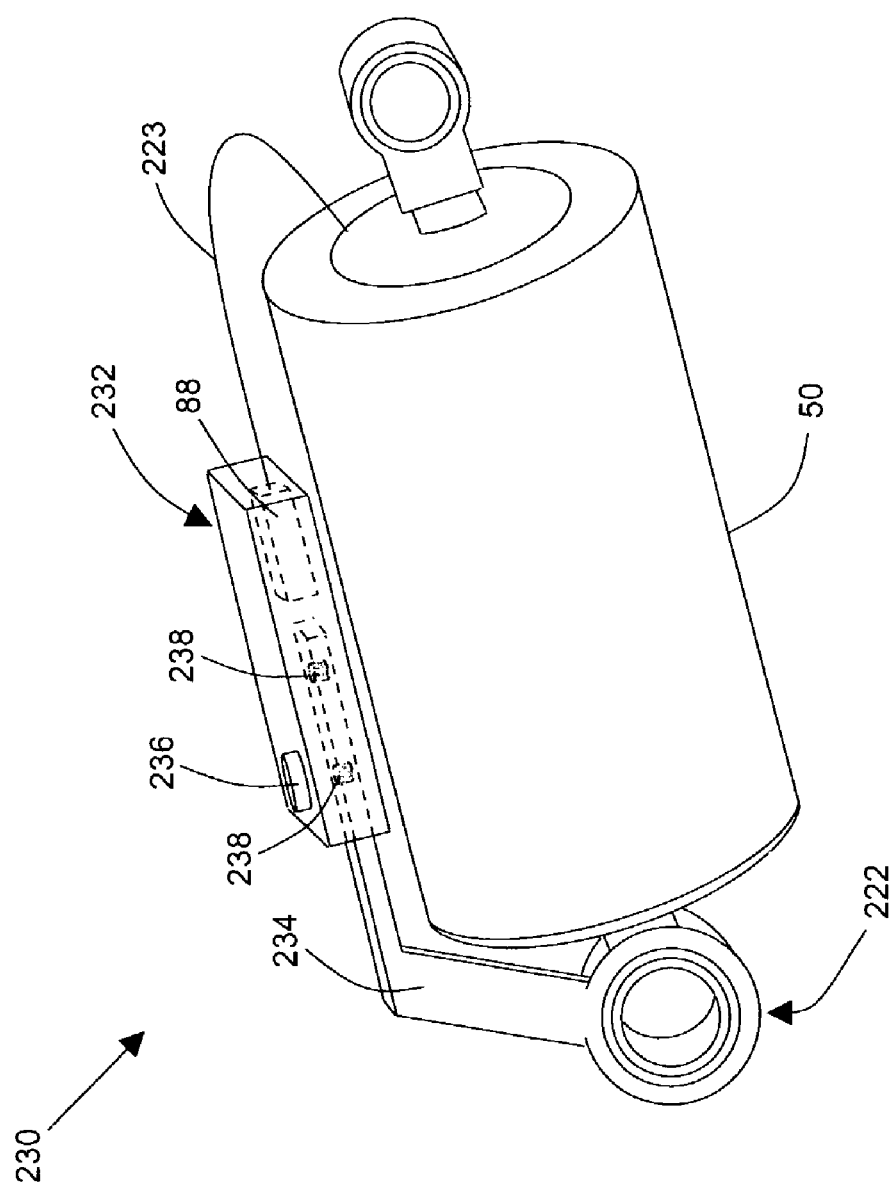
FIG. 11 is an illustration of a damping device, linear position sensor and control system in accordance with an exemplary embodiment of the present invention.

FIG. 11 illustrates a suspension control system 230 having adjustable damping device 50 utilizing an external linear sensor system 232. The damping device 50 contains a field responsive fluid, for example a magnetorheological fluid (MR) or an electrorheological fluid, whose yield shear strength may be changed upon the application of a magnetic/electric field. A position sensor 236 is connected to a controller system 88 and serves to sense the position of a dual magnetic 238 linear probe 234. In one embodiment, a second sensor may be used that is a duplicate of the original sensor operable for signaling the control system 88 when an end stop trip point 76, 78 (FIG. 1) is passed. The dual magnetic linear probe 234 is connected to a rod end 222 of the damping device 50. The position sensor is electronically connected to the control system 88, which in turn is electronically connected to the damping device 50 via link 223. The damping device 50 serves to control the displacement of the seat 100 during operation. Electric signals are supplied to the damping device 50 during system operation to provide damping sufficient to prevent the system from reaching the maximum and minimum end stop limits 70, 72. A single fixed magnet combined with a ferrous interrupter may also be used.

It is apparent that there have been provided, in accordance with the systems and methods of the present invention, high-function damping control systems and methods primarily for, but not restricted to, suspended seat use. Although the systems and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A motion control device comprising:
   a suspension system damping device having a piston with a first piston end stop and a second piston end stop, said first piston end stop and said second piston end stop defining a suspension system damping device maximum piston travel distance, said suspension system damping device having a first control limit, said first control limit defining a first position along said maximum piston travel distance at which a first control limit piston sensor is set to trip proximate said first piston end stop, said suspension system damping device having a second control limit, said second control limit defining a second position along said maximum piston travel distance at which a second control limit piston sensor is set to trip proximate said second piston end stop,
   a suspension system damping device first mode having a first steady state level of damping, said first steady state level of damping corresponding to a normal operation damping outside said first control limit and said second control limit and within said maximum piston travel distance;
   a suspension system damping device end stop second mode having a second end stop level of damping corresponding to a predetermined function, wherein said motion control device does not sense a specific detailed present position of said piston within said maximum piston travel distance outside said first control limit and said second control limit, said motion control device applying said suspension system damping device end stop second mode second end stop level of damping when said piston is in said first control limit and said second control limit, and said motion control device applying said suspension system damping device first mode first steady state level of damping when said piston is outside said first control limit and said second control limit.

2. The motion control device of claim 1, wherein said first control limit piston sensor includes a 2-bit sensor sub-system and said second control limit piston sensor includes a 2-bit sensor sub-system.

3. The motion control device of claim 1, wherein the predetermined function comprises a function selected from the group consisting of a second steady state function, a ramp-up function, a ramp-down function, a magnitude function, a duration function, and a duration truncating function.

4. The motion control device of claim 1, wherein the control system truncates the predetermined function if the motion control device piston exits said first control limit or said second control limit within a predetermined time period.

5. The motion control device of claim 1, wherein the second mode comprises a pseudo-adaptive state of damping.

6. The motion control device of claim 1, wherein the damping device contains a field responsive fluid selected from the group consisting of magnetorheological fluid and electrorheological fluid.

7. The motion control device of claim 3, wherein the control system further comprises a control method that applies the predetermined function, wherein the control method is selected from the group consisting of a timed response having a predetermined shut-off time, a truncated response that cuts short the timed response, and a response based on a measure of relative velocity.

8. The motion control device of claim 2, wherein said first control limit piston sensor 2-bit sensor sub-system includes a first control limit 2-bit sensor sub-system sensor 1 and a first control limit 2-bit sensor sub-system sensor 2 for providing an estimated approaching first end stop relative velocity, and said second control limit piston sensor 2-bit sensor sub-system includes a second control limit 2-bit sensor sub-system sensor 1 and a second control limit 2-bit sensor sub-system sensor 2 for providing an estimated approaching second end stop relative velocity.

9. A method for limiting end stop collisions, comprising:
providing a suspension system having an upper end stop, a lower end stop, an upper end stop control limit, a lower end stop control limit, a first mode travel distance between said upper end stop control limit and said lower end stop control limit, and a damper device piston for adjusting the suspension velocity,
sensing the position of the suspension system damper device piston within said upper and lower end stop control limits and not sensing a specific detailed present position of the suspension system damper device piston within said first mode travel distance,
applying a suspension system damper device piston second mode end stop level of damping when said piston is in said upper control limit and said lower control limit, and applying a suspension system damper device piston first mode level of damping when said piston is within said first mode travel distance.

10. The method of claim 9, using a first upper binary output sensor having only a first upper output and a second upper output for sensing said piston in said upper end stop control limit, and using a second lower binary output sensor having only a first lower output and a second lower output for sensing said piston in said lower end stop control limit.

11. The method of claim 9, wherein applying a suspension system damper device piston second mode end stop level of damping includes applying a predetermined function, said predetermined function comprises a second mode end stop level of damping function selected from the group consisting of a steady state function, a ramp-up function, a ramp-down function, a magnitude function, a duration function, and a duration truncating function.

12. The method of claim 9, wherein applying a suspension system damper device piston second mode end stop level of damping includes applying a predetermined function using a control method selected from the group consisting of a timed response having a predetermined shut-off time, a truncated response that cuts short the timed response, and a response based on a measure of relative velocity.

13. The method of claim 9, wherein sensing includes providing an upper control limit piston sensor sub-system with an upper control limit sensor sub-system sensor 1 and an upper control limit sensor sub-system sensor 2 for providing an estimated approaching upper end stop relative velocity, and providing a lower control limit piston sensor sub-system with a lower control limit sensor sub-system sensor 1 and a lower control limit sensor sub-system sensor 2 for providing an estimated approaching lower end stop relative velocity.

14. The method of claim 10 wherein sensing includes providing a first upper 2-bit sensor sub-system, said first upper 2-bit sensor sub-system including said first upper binary output sensor and providing a second lower 2-bit sensor sub-system, said second lower 2-bit sensor sub-system including said second lower binary output sensor.

15. The method of claim 14 wherein said first upper 2-bit sensor sub-system includes a third upper binary output sensor, and said second lower 2-bit sensor sub-system includes a fourth lower binary output sensor.

16. The method of claim 12, wherein the control method comprises the truncated response if the damper device changes position from an end stop approaching position to a normal position within a predetermined time period.

17. The method of claim 11, wherein the first mode level of damping comprises a pseudo-adaptive state of damping.

* * * * *